SCANNING DEVICE

Filed June 24, 1966

Inventor
Wilford R. Schreier
By
Gradolph, Love, Rogers & Van Sciver
Attys

United States Patent Office 3,422,376

Patented Jan. 14, 1969

3,422,376

SCANNING DEVICE

Wilford R. Schreier, Bensenville, Ill., assignor to Hammond Corporation, Chicago, Ill., a corporation of Delaware Filed June 24, 1966, Ser. No. 560,212

U.S. Cl. 333—7 3 Claims

Int. Cl. H03h 5/00; H01p 5/12

ABSTRACT OF THE DISCLOSURE

A capacitive scanner of the type in which signal paths are established between fixed input plates and fixed output plates by a rotating scanner which is coupled capacitively to the input and output plates and in which a high value leakage path is provided from the otherwise insulated rotor to ground to remove static electric charges from the rotor.

This invention relates broadly to an improved capacitive scanner, and is more particularly concerned with a scanner for modifying electrical tone signals in electrical musical instruments, such as those of the organ type, to produce animation effects.

In the prior art, animation scanners, such as that disclosed in FIG. 18 of Hanert Patent No. 2,905,040, have consisted of rotating capacitor plates moving through a group of stationary capacitor plates. Audio frequency signals are applied to the fixed plates. The signals in succession on the fixed plates are then transferred to the rotor plate as the rotor meshes in succession with the stator plates and is picked up by a carbon brush or other slipping contact riding on a pin connected to the rotor at its axis.

In general, this invention provides a capacitive input to a scanner and a capacitive output comprising two rotor discs diametrically opposed and electrically independent of each other to pass signals to stator discs. It is by this means that the complications of the commutation systems of the prior art involving brushes and slip rings to take the signal from the revolving rotor to external circuitry are avoided. Thus, problems of brush wear, noise, and short life expectancy are obviated.

Specifically, audio-input signals are supplied to stator plate assemblies, rotor assemblies pick up these signals, and each rotor assembly within the scanner is electrically connected to a disc which revolves with the rotor. This disc is in a plane normal to the axis of rotation, and is positioned near a similar disc which is stationary, being affixed to the housing of the scanner but insulated electrically from the housing. These two discs form an air dielectric capacitor of constant capacity even though one disc rotates. The signal is thus transferred from the revolving disc to the stationary disc, the stationary disc being the source of signal for an output circuit.

It is an object of this invention to provide a novel scanning device for transferring audio frequency signals from a revolving rotor portion of a scanner to external circuitry with no mechanical contacts.

Another object of this invention is to provide a novel dual capacitive scanner having two rotor discs diametrically opposed and electrically independent of each other, in which separate signals from the rotor discs are picked up by stator mounted discs in capacitive relationship with the rotor discs.

A further object of this invention is to provide a non-contact pickup from a plural input source to a dual signal output.

Other objects and advantages will become apparent from the following description taken in conjunction with the accompanying drawings wherein.

Figure 1:
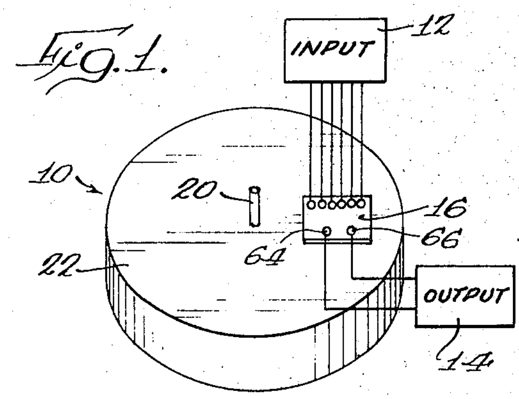
FIG. 1 is a perspective view of a scanner pickup device of the invention.
Figure 2:
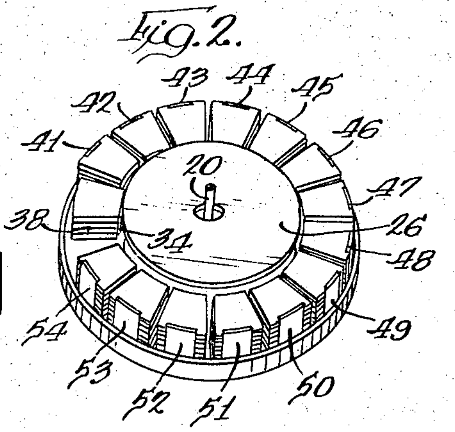
FIG. 2 is a perspective view of the pickup device of FIG. 1 without the cover and with certain of the elements omitted so as better to disclose the structure.
Figure 3:
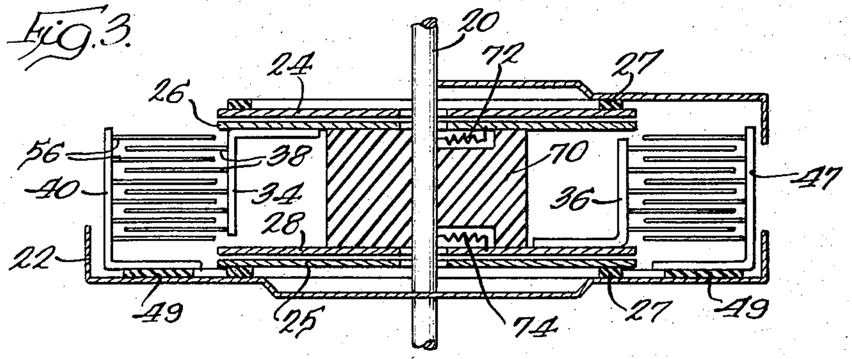
FIG. 3 is a front fragmentary sectional view of the pickup device of FIGS. 1 and 2.

FIGS. 1 to 3 show the pickup device 10 of the invention, a source of input signals 12 and an output circuit 14 connected at terminals 16 on the housing 22. A rotatable shaft 20 passes through the housing and is grounded thereto and to the frame in which the housing is mounted.

Within the housing, top and bottom stationary capacitive discs 24 and 25 are supported from the housing upon insulating pads or rings 27 and in proximity to parallel rotating discs 26 and 28. The discs 26 and 28 are mechanically secured to the shaft 20 but insulated therefrom by a block 70. Extending from the peripheries of the rotating discs 26 and 28 are rotating E-shaped five-blade assemblies 34 and 36, respectively, having blades 38 interleaved with blades 56 of a ring of complementary stator blade assemblies 40 to 55 which are fixed in the housing by insulating mountings 49, as shown in FIG. 3. FIG. 2 shows the general assembly with some of the stator elements omitted so as better to disclose the rotor blade assemblies.

The shaft 20 is supported in bearings, not shown, and is coupled in driven relationship to any suitable rotating means (not shown) such as a motor driven belt and pulley arrangement capable of rotating the shaft 20 at a suitable slow speed.

In operation, the movable blade assemblies 34 and 36 are rotated in meshing relationship successively past the fixed capacitor plates or blades 56 of the stator assemblies 40 to 55 which are equally spaced in a ring around the periphery. Source 12 supplies the various audio tone signals to the individual stator assemblies 40 to 55, and these signals are picked up capacitively by the rotor assemblies 34 and 36, which, in turn, are electrically connected to one or the other of rotor discs 26 and 28. An output signal is derived from each of the stationary discs 24 and 25 which pick up the signals from the rotating discs 26 and 28, respectively, and these stationary discs are connected respectively to terminals 64 and 66 which supply the audio signals separately to the output circuit 14.

The number of stationary segments 40–55 in the scanning device may be 16, as shown, or more or less as desired, depending upon practical mechanical considerations, and tempered to some extent by the problem of expense. Between the stationary discs 24 and 25 and the parallel rotating discs 26 and 28, respectively, the spacing remains constant, and therefore the capacity does not change in spite of the relative rotation.

Figure 4:
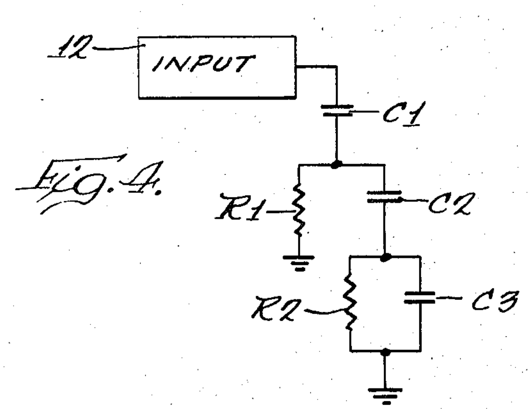
FIG. 4 is a schematic diagram of the equivalent circuit of the invention.

FIG. 4 discloses a schematic equivalent circuit for one channel through the device. It comprises a typical amplifier 12 having its output connected through series capacitors C–1, C–2, and C–3 to ground. Resistor R–1 is connected from the junction between C–1 and C–2 to ground, and resistor R–2 bridges C–3. These elements represent the following in a typical practical example, and the values given should be understood as illustrative and not limitative of the invention:

C–1 is the capacity from one set of stator plates to one set of rotor plates, approximately 15 picofarads;

C–2 is the capacity from one of the rotating discs to its stationary disc, approximately 50 picofarads;

C–3 represents the amplifier input capacity, approximately 1200 picofarads;

R–1 is the leakage path from revolving system to ground; and

R–2 is the amplifier input resistance, approximately 6 megohms.

Thus, the net capacity from input to output is given by $$C=\frac{C\text{–}1\times C\text{–}2}{C\text{–}1+C\text{–}2}$$

It can be seen from this that by making C–2 large in comparison to C–1, the net capacity is essentially C–1. To promote this relationship, the revolving and stationary discs should be made as large as practical and as close to each other as construction tolerances reasonably permit.

In this system it will be noted, the revolving electrical system, comprised of the plates 26 and 28 and the scanning mechanism 34 and 36, is electrically insulated from the shaft 20 and thus from ground by the insulating center section 70. There is, therefore, the possibility of an electrostatic charge accumulating on this revolving system. To prevent such charge accumulation, a leakage path of high DC resistance, represented by the resistors 72 and 74, is provided from the rotating elements to ground via the shaft 20 carrying the rotating elements, the shaft, of course, being grounded through its bearings, not shown.

Figure 5:
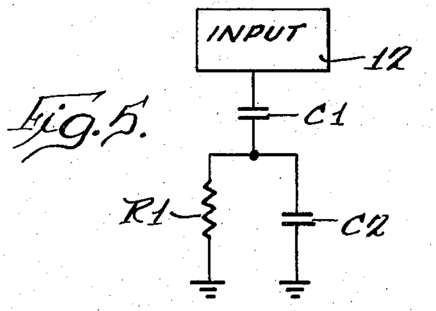
FIG. 5 is a simplified schematic diagram of the circuit of the invention.

The lowest frequency that must be transferred through the scanner determines the lowest practical value of capacitance that can be used. As can be seen from the values indicated, C–3 is many times as large as C–2 and thus has an impedance much lower than C–2. For the purpose of determining an appropriate value for the leakage resistance R–1, C–3 can be assumed to be a short circuit, and the circuit then reduces to that of FIG. 5. It is now apparent that for any given value of R–1, the output will be down three decibels at that frequency where R–1 becomes equal in magnitude to the impedance of C–2. At lower frequencies the output will decrease at a six-decibel-per-octave rate. It is thus clear that there is no problem in finding a resistor which will remove the slowly accumulated static charge without appreciably attenuating the signal.

In summary, applicant has disclosed a device for transferring plural input signals in order to a pair of revolving rotor portions of a scanner and then to a pair of external circuits with no brushes, slip rings, or other mechanical connections, using only capacitive action between input and output of the system.

Various modifications may be made in the invention without departing from the spirit and scope thereof, and it is desired, therefore, that only such limitations shall be placed thereon as are imposed by the prior art and are set forth in the appended claims.

I claim:

1. A capacitor scanning device comprising a plurality of stator input means, a pair of rotor pickup means in proximity to said stator means and adapted to scan said stator input means, a pair of rotating discs electrically connected to said rotor pickup means, a pair of stationary discs in proximity to said rotating discs, a plural source of input frequencies corresponding to the number of stator input means connected to said stator input means, whereby said input signals are passed in succession from said stator input means to said stationary discs solely by capacitive action, and a high value leakage resistor means connected from said rotor pickup means to ground to remove static electric charges from said rotating discs and said rotor pickup means.

2. A capacitor scanning device comprising a stator means, a rotor pickup means in proximity to said stator means and adapted to scan said stator means, a disc mounted to rotate with said rotor pickup means and electrically connected to said rotor pickup means, a stationary disc in proximity to said rotating disc, means providing signal input and output connections to said stator means and said stationary disc, a high value leakage resistor means connected from said rotor pickup means to ground to remove static electric charges from said rotating disc and said rotor pickup means, and means for rotating said rotor pickup means.

3. In a capacitive scanning device, means providing stationary input and output capacitor plate forming elements, an insulated scanning rotor capacitively coupled to both said input and output plate forming elements and providing a signal path between said input and output plate forming elements, means for rotating said scanning rotor, and means providing a high value leakage resistor connected from said insulated scanning rotor to ground to remove static electric charges from said scanning rotor.

References Cited

UNITED STATES PATENTS

| | | | |
|---|---|---|---|
| 2,439,255 | 4/1948 | Longfellow | 333—7 |
| 2,760,127 | 8/1956 | Duncan et al. | |
| 2,790,955 | 4/1957 | Lanphier | 333—24 |
| 2,818,550 | 12/1957 | Crandell et al. | 333—24 |
| 2,855,572 | 10/1958 | Gitzendanner et al. | 333—24 |

FOREIGN PATENTS

| | | |
|---|---|---|
| 702,074 | 1/1965 | Canada. |
| 829,295 | 3/1960 | Great Britain. |

ELI LIEBERMAN, *Primary Examiner.*

MARVIN NUSSBAUM, *Assistant Examiner.*

U.S. Cl. X.R.

333—24